United States Patent
Kim et al.

(10) Patent No.: US 11,554,965 B2
(45) Date of Patent: Jan. 17, 2023

(54) METHOD FOR PRODUCING LITHIUM HYDROXIDE FROM LITHIUM PHOSPHATE

(71) Applicant: POSCO, Pohang-si (KR)

(72) Inventors: Kyunghoon Kim, Pohang-si (KR); Sang Min Lee, Pohang-si (KR); Jong-Hak Lee, Pohang-si (KR); Ki Young Kim, Pohang-si (KR); Jae Hyug Choi, Pohang-si (KR); Souhwan Son, Pohang-si (KR)

(73) Assignee: POSCO CO., LTD, Pohang-si (KR)

( * ) Notice: Subject to any disclaimer, the term of this patent is extended or adjusted under 35 U.S.C. 154(b) by 473 days.

(21) Appl. No.: 16/469,807

(22) PCT Filed: Dec. 13, 2017

(86) PCT No.: PCT/KR2017/014652
§ 371 (c)(1),
(2) Date: Jun. 14, 2019

(87) PCT Pub. No.: WO2018/110974
PCT Pub. Date: Jun. 21, 2018

(65) Prior Publication Data
US 2020/0079657 A1 Mar. 12, 2020

(30) Foreign Application Priority Data
Dec. 15, 2016 (KR) .................. 10-2016-0171619

(51) Int. Cl.
*C01D 15/02* (2006.01)
*C01B 25/30* (2006.01)
(Continued)

(52) U.S. Cl.
CPC .............. *C01D 15/02* (2013.01); *C01B 25/30* (2013.01); *C01B 25/32* (2013.01); *C01F 11/46* (2013.01)

(58) Field of Classification Search
CPC ......... C01D 15/02; C01B 25/30; C01B 25/32; C01F 11/46
(Continued)

(56) References Cited

U.S. PATENT DOCUMENTS

| | | | |
|---|---|---|---|
| 2,931,703 A | 4/1960 | Reader | |
| 2008/0157024 A1 | 7/2008 | Adamson et al. | |

(Continued)

FOREIGN PATENT DOCUMENTS

| | | |
|---|---|---|
| CN | 1871726 A | 11/2006 |
| CN | 101302018 A | 11/2008 |

(Continued)

OTHER PUBLICATIONS

Chinese Office Action dated Mar. 24, 2021 issued in Chinese Patent Application No. 201780077954.4.
(Continued)

*Primary Examiner* — Melissa S Swain
(74) *Attorney, Agent, or Firm* — Morgan, Lewis & Bockius LLP

(57) ABSTRACT

The present invention relates to a method of manufacturing lithium hydroxide, which includes adding at least one acid selected from hydrochloric acid, sulfuric acid, and nitric acid into lithium phosphate slurry including a lithium phosphate particle, adding an alkali material to the lithium phosphate slurry including the acid, and converting it into a lithium hydroxide aqueous solution.

4 Claims, 2 Drawing Sheets

(51) Int. Cl.
  *C01B 25/32* (2006.01)
  *C01F 11/46* (2006.01)
(58) Field of Classification Search
  USPC .......................................................... 423/641
  See application file for complete search history.

(56) References Cited

U.S. PATENT DOCUMENTS

| | | | |
|---|---|---|---|
| 2009/0117022 A1 | 5/2009 | Nuspl et al. | |
| 2015/0071837 A1* | 3/2015 | Chon | B01J 19/18 423/179.5 |
| 2015/0197830 A1* | 7/2015 | Chon | C22B 26/12 423/179.5 |
| 2016/0329565 A1 | 11/2016 | Shin et al. | |
| 2017/0084965 A1* | 3/2017 | Song | B01D 15/10 |

FOREIGN PATENT DOCUMENTS

| | | |
|---|---|---|
| CN | 104220371 A | 12/2014 |
| JP | 2009-269810 A | 11/2009 |
| JP | 5632169 B | 11/2014 |
| KR | 10-2012-0063070 A | 6/2012 |
| KR | 10-1181922 B1 | 9/2012 |
| KR | 10-1193142 B1 | 10/2012 |
| KR | 10-2013-0113287 A | 10/2013 |
| KR | 10-1405486 B1 | 6/2014 |
| KR | 10-1432793 B1 | 8/2014 |
| KR | 10-2014-0144380 A | 12/2014 |
| KR | 10-2015-0080113 A | 7/2015 |
| KR | 10-1604954 B1 | 3/2016 |
| KR | 101604954 B1 | 3/2016 |

OTHER PUBLICATIONS

Z. Qiaoling, et al., "Chemical Technology," National Defense Industry Press, Jul. 2015 (partial English translation).

Archival Library of Chinese Publications CIP Data No. (97) No. 28941, Jan. 1999 (partial English translation).

International Search Report dated Mar. 20, 2018, issued in corresponding International Patent Application No. PCT/KR2017/014652.

Korean Notice of Allowance dated Aug. 20, 2019 issued in Korean Patent Application No. 10-2017-0172452.

* cited by examiner

METHOD FOR PRODUCING LITHIUM HYDROXIDE FROM LITHIUM PHOSPHATE

CROSS-REFERENCE OF RELATED APPLICATIONS

This application is the U.S. National Phase under 35 U.S.C. § 371 of International Patent Application No. PCT/KR2017/014652, filed on Dec. 13, 2017, which in turn claims the benefit of Korean Patent Application No. 10-2016-0171619, filed Dec. 15, 2016, the entire disclosures of which applications are incorporated by reference herein.

BACKGROUND OF THE INVENTION

(a) Field of the Invention

The present invention relates to a method for manufacturing lithium hydroxide from lithium phosphate and more particularly, a method of converting lithium phosphate slurry including a lithium phosphate particle into an aqueous solution including lithium hydroxide.

(b) Description of the Related Art

As a market for IT and an electric vehicle has rapidly grown, a demand for lithium, an essential raw material for a rechargeable battery, is also expected to be largely increased. A market for the lithium for a rechargeable battery is highly concentrated in Korea, China, and Japan, but Korea imports all the lithium and thus needs to secure a stable supply. Accordingly, development of lithium precipitation technology from an ore and a brine is being made, and the lithium precipitation technology from the brine holds a superior position in terms of a manufacturing cost. Several companies produce a large amount of lithium in South America, China, and the like, and research on domestically producing lithium is also being made.

In general, a method of precipitating lithium included in a brine into lithium phosphate and converting the lithium phosphate into lithium hydroxide is used. For this purpose, an electrolysis process is conventionally used, or a method of adding an anion precipitating agent and the like have been suggested.

However, the electrolysis process consumes lots of energy, and the method of adding an anion precipitating agent requires extremely long reaction time, which are difficult to apply to a practical process.

Accordingly, development of technology of efficiently converting lithium phosphate into a lithium hydroxide aqueous solution is urgently required.

SUMMARY OF THE INVENTION

Technical Object

The present invention is to accomplish a technical purpose of effectively converting chemically stable lithium phosphate into lithium hydroxide and to provide a method of increasing this conversion rate with minimum energy and a simplified process.

Technical Solution

A method of manufacturing lithium hydroxide according to an example embodiment of the present invention includes adding at least one acid selected from hydrochloric acid, sulfuric acid, and nitric acid into lithium phosphate slurry including a lithium phosphate particle, and adding an alkali material to the lithium phosphate slurry including the acid and converting it into a lithium hydroxide aqueous solution.

The lithium phosphate slurry including the acid may have a lithium concentration of greater than or equal to 4,000 mg/L.

An amount of the added acid may be greater than or equal to 0.5 equivalents based on an amount of the added lithium phosphate.

An amount of the added alkali material may range from 0.8 to 1.5 equivalents based on an amount of the added lithium phosphate.

The alkali material may be one or more selected from the group consisting of $Ca(OH)_2$, NaOH, and CaO.

In the step of adding the alkali material to the lithium phosphate slurry including the acid and converting it into the lithium hydroxide aqueous solution, gypsum and hydroxyapatite may be precipitated.

After the step of adding the alkali material to the lithium phosphate slurry including the acid and converting it into the lithium hydroxide aqueous solution, concentrating the lithium hydroxide aqueous solution to prepare lithium hydroxide may be further included.

A method of manufacturing lithium hydroxide according to another example embodiment of the present invention may include preparing lithium phosphate slurry including a lithium phosphate particle, adding the lithium phosphate slurry and an alkali material to a milling machine to manufacture a milling filtrate, adding the milling filtrate to a reactor to obtain a reaction product, and converting the reaction product into lithium hydroxide.

In the present example embodiment, the step of preparing the lithium phosphate slurry may further include adding at least one acid selected from the group consisting of hydrochloric acid, sulfuric acid, and nitric acid to the lithium phosphate slurry.

Herein, an amount of the added acid may range from 0.012 equivalents to 0.3 equivalents based on an amount of the added lithium phosphate.

A lithium concentration of the lithium phosphate slurry may be greater than or equal to 4,000 mg/L.

An amount of the alkali material may range from 0.8 to 1.5 equivalent based on an amount of the added lithium phosphate.

The alkali material may be one or more selected from the group consisting of $Ca(OH)_2$, NaOH, and CaO.

In the step of obtaining the reaction product, gypsum and hydroxyapatite may be precipitated.

The step of converting the reaction product into lithium hydroxide may be performed by concentrating the lithium hydroxide aqueous solution obtained by liquid/solid separation of the reaction product.

Effect of the Invention

As mentioned above, the method of manufacturing lithium hydroxide according to the present invention may increase a conversion rate from lithium phosphate to lithium hydroxide with minimum energy and a simplified process.

DETAILED DESCRIPTION

Figure 1:
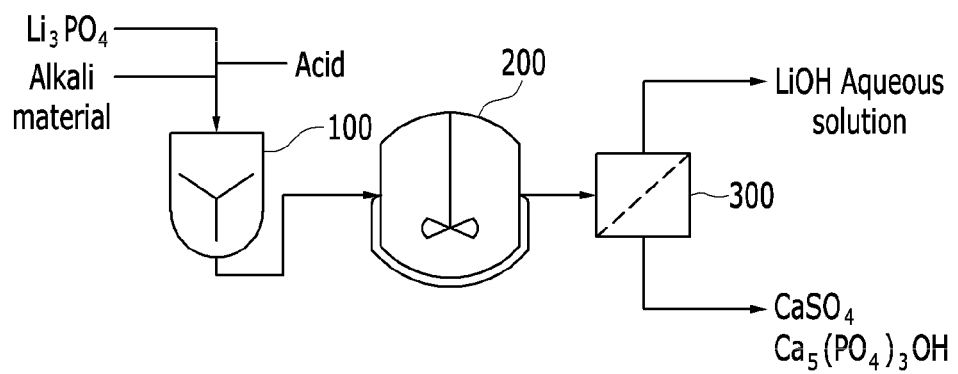
FIG. 1 shows a process of manufacturing lithium hydroxide from lithium phosphate according to an example embodiment.

The present invention will be described more fully hereinafter with reference to the accompanying drawings, in which example embodiments of the invention are shown. As those skilled in the art would realize, the described embodiments may be modified in various different ways, all without departing from the spirit or scope of the present invention.

Hereinafter, a method of manufacturing lithium hydroxide according to an example embodiment of the present invention is described in detail.

A method of manufacturing lithium hydroxide according to an example embodiment includes adding at least one acid selected from hydrochloric acid, sulfuric acid, and nitric acid into lithium phosphate slurry including a lithium phosphate particle, and adding an alkali material to the lithium phosphate slurry including the acid and converting it into a lithium hydroxide aqueous solution.

First, the step of adding at least one acid selected from hydrochloric acid, sulfuric acid, and nitric acid into the lithium phosphate slurry including the lithium phosphate particle is described.

In the present specification, the "lithium phosphate slurry" used in the present specification indicates a state that the solid lithium phosphate particles are not dissolved but mixed with an aqueous solution in which lithium phosphate saturated.

The lithium phosphate has a low solubility in water. In other words, lithium phosphate ($Li_3PO_4$) has 0.039 g/L of solubility in water at room temperature (20° C.).

However, the solubility is improved when acid is a little added to the lithium phosphate. In other words, when the lithium phosphate reacts with the acid and forms $Li_2HPO_4$ or $LiH_2PO_4$, the solubility is increased. Specifically, $Li_2HPO_4$ has solubility of 44.3 g/L (0° C.), and $LiH_2PO_4$ has solubility of 1,260 g/L (0° C.).

In other words, the solubility of the lithium phosphate is increased by adding the acid to the lithium phosphate slurry in this step.

In this step, the added acid may be selected from the group consisting of hydrochloric acid, sulfuric acid, and nitric acid. An amount of the added acid may be greater than or equal to 0.5 equivalents, and more specifically, 0.5 equivalents to 1.1 equivalent or 0.5 equivalents to 1 equivalent based on an amount of the lithium phosphate particle. However, an amount of the added acid may not desirably be greater than 10% based on that of the entire slurry. When the acid is added in an amount of less than 0.5 equivalents, the conversion rate from lithium phosphate to lithium hydroxide is deteriorated. In addition, when the acid is added in an excessive amount, an acid ion concentration is increased in a solution to which the acid is added, and thus the solution needs to be treated through an impurity removal process, and herein, an amount of an additive for removing impurities may be increased.

For example, the acid used in the present step may be sulfuric acid. According to Reaction Scheme 1, the lithium phosphate may completely react with the sulfuric acid, and according to Reaction Scheme 2, the lithium phosphate having low solubility in water reacts with a minimum amount of the sulfuric acid and is converted into a lithium compound having high solubility.

In this step, all the reactions of Reaction Scheme 1 and 2 all may occur.

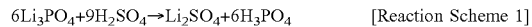
[Reaction Scheme 1]

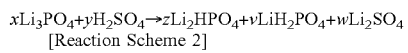
[Reaction Scheme 2]

The lithium phosphate slurry including the acid may have a lithium concentration of greater than or equal to 4,000 mg/L, specifically 4,000 mg/L to 20,000 mg/L or 5,000 mg/L to 15,000 mg/L. When the lithium phosphate slurry including the acid has a lithium concentration of greater than 20,000 mg/L, the lithium phosphate slurry has extremely high viscosity and thus may have difficulties in smooth stirring and the like. In addition, when the lithium phosphate slurry has a lithium concentration of less than 4,000 mg/L, an amount of lithium staying in the milling process is so small that a final conversion rate from lithium phosphate to lithium hydroxide may be decreased.

Next, an alkali material is added to the lithium phosphate slurry including the acid to convert it into a lithium hydroxide aqueous solution. The alkali material added in this step may be one or more selected from the group consisting of $Ca(OH)_2$, NaOH, and CaO.

In addition, an amount of the added alkali material may range from 0.8 to 1.5 equivalents, and more specifically 1 equivalent to 1.2 equivalents based on an amount of the added lithium phosphate. When the amount of the alkali material satisfies the range, the conversion rate from lithium phosphate to lithium hydroxide is fast.

For example, the alkali material added in this step may be $Ca(OH)_2$, and reactions of Reaction Schemes 3 and 4 may occur.

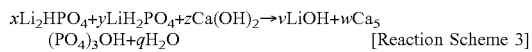
[Reaction Scheme 3]

[Reaction Scheme 4]

In this step, $Ca(OH)_2$ may be used as a powder type and mixed in a mixer. Subsequently, the reactions of Reaction Schemes 3 and 4 may be performed under an atmospheric pressure (1 atm) at room temperature (25° C.).

In other words, lithium hydroxide (LiOH) is formed through the reactions of Reaction Schemes 3 and 4. In addition, gypsum ($CaSO_4$) and hydroxyapatite ($Ca_5(PO_4)_3OH$) formed with the lithium hydroxide (LiOH) in the reactions are solid-phase and thus separated through a solid/liquid separator. A lithium hydroxide (LiOH) aqueous solution obtained by separating the solid-phase components may be crystallized and form the lithium hydroxide.

Hereinafter, referring to FIG. 1, a method for manufacturing lithium hydroxide from lithium phosphate according to the present embodiment is illustrated in detail. FIG. 1 shows a process of manufacturing lithium hydroxide from lithium phosphate according to an example embodiment.

Referring to FIG. 1, a lithium phosphate particle, acid, and an alkali material are added to a mixer 100. Herein, the lithium phosphate particle and the acid are added first, and the alkali material is added later. When the lithium phosphate particle and the acid are added therein, the reactions of Reaction Schemes 1 and 2 occur. The added lithium phosphate may be a lithium phosphate cake. The acid may be selected from the group consisting of hydrochloric acid, sulfuric acid, and nitric acid.

The alkali material may be one or more selected from the group consisting of $Ca(OH)_2$, NaOH, and CaO. The alkali material is added in the mixer 100, mixed with the lithium phosphate particle and the acid therein, and the mixture is moved to a reactor 200. In the reactor 200, the reactions of Reaction Schemes 3 and 4 may occur under an atmospheric pressure at room temperature.

Next, products obtained in the reactor 200 after the reactions are moved to a solid/liquid separator 300. In the solid/liquid separator 300, LiOH having a liquid phase and gypsum ($CaSO_4$) and hydroxyapatite ($Ca_5(PO_4)_3OH$) having a solid-phase among the products are separated.

Lithium carbonate or lithium hydroxide may be produced from the separated LiOH aqueous solution through a carbonation or crystallization process. The gypsum and hydroxyapatite may be reacted with sulfuric acid and phosphoric acid and gypsum may be produced.

A method of manufacturing lithium hydroxide according to another example embodiment of the present invention may include preparing lithium phosphate slurry including a lithium phosphate particle and adding an alkali material to the lithium phosphate slurry to convert it into lithium hydroxide, wherein the lithium hydroxide may be converted using a milling machine.

First, the step of preparing the lithium phosphate slurry including the lithium phosphate particle is prepared.

In the present specification, a term of "lithium phosphate slurry" indicates a state that solid lithium phosphate particles are mingled with an aqueous solution in which lithium phosphate is saturated.

The lithium phosphate has a low solubility in water. In other words, the lithium phosphate ($Li_3PO_4$) has 0.039 g/L of solubility in water at room temperature (20° C.).

However, when the lithium phosphate slurry is added in a milling machine with the alkali material which will be described later and milled therewith, a dissolution rate of the lithium phosphate is improved, and thus a lithium concentration in a milling filtrate is fast increased. Accordingly, when the lithium phosphate is converted into lithium hydroxide through the milling process, a conversion rate from the lithium phosphate to the lithium hydroxide may be increased.

On the other hand, the step of preparing the lithium phosphate slurry may further include adding at least one acid selected from the group consisting of hydrochloric acid, sulfuric acid, and nitric acid to the lithium phosphate slurry.

In this way, when the acid is a little added to the lithium phosphate, solubility of the lithium phosphate is improved as illustrated in an embodiment. In other words, when the lithium phosphate reacts with the acid and forms $Li_2HPO_4$ or $LiH_2PO_4$, solubility of the lithium phosphate is increased. Specifically, solubility of $Li_2HPO_4$ is 44.3 g/L (0° C.), and solubility of $LiH_2PO_4$ is 1,260 g/L (0° C.).

In other words, the solubility of lithium phosphate may be increased by additionally adding the acid during preparation of the lithium phosphate slurry.

Herein, an amount of the added acid may be greater than or equal to 0.12 equivalents and specifically, in a range of 0.12 equivalents to 0.3 equivalents, or 0.013 equivalents to 0.2 equivalents based on an amount of the lithium phosphate particle. However, the amount of the added acid may not be greater than 10% based on the entire amount of the slurry. When the amount of the added acid satisfies the range, the conversion rate from lithium phosphate to lithium hydroxide may be further improved. In addition, when a process of removing impurities from the obtained reaction products in the reactor, which will be described later, may be if necessary performed, the lithium phosphate slurry including the acid may have a desired effect by using a small amount of an additive for removing impurities.

For example, the added acid may be sulfuric acid. The lithium phosphate completely reacts with the sulfuric acid according to Reaction Scheme 1, that is, the lithium phosphate having low solubility in water reacts with a minimum amount of the sulfuric acid and thus forms a lithium compound having high solubility according to Reaction Scheme 2.

Herein, the lithium phosphate slurry including the acid may have a lithium concentration of greater than or equal to 4,000 mg/L, specifically 4,000 mg/L to 20,000 mg/L or 5,000 mg/L to 15,000 mg/L. When the lithium phosphate slurry including the acid has a lithium concentration of greater than 20,000 mg/L, the lithium phosphate slurry has too high viscosity to be smoothly stirred and the like. In addition, when the lithium phosphate slurry has a lithium concentration of less than 4,000 mg/L, an amount of lithium staying in the milling process is so small that a final conversion rate from lithium phosphate to lithium hydroxide may be deteriorated.

Next, the lithium phosphate slurry is prepared as described above and then the step of adding the lithium phosphate slurry and an alkali material to a milling machine to manufacture a milling filtrate is performed and the step of adding the milling filtrate to the reactor to obtain the reaction product is performed.

Herein, the milling machine may be, for example, at least one of an attrition mill and a ball mill.

When the milling filtrate is prepared as described above, an amount of lithium has been increased in the milling filtrate by improving a dissolution rate of the lithium phosphate, and thus the final conversion rate of lithium hydroxide may be improved.

The alkali material may be one or more selected from the group consisting of $Ca(OH)_2$, NaOH, and CaO.

In addition, an amount of the added alkali material may range from 0.8 to 1.5 equivalents, and more specifically 1 equivalent to 1.2 equivalents based on an amount of the added lithium phosphate. When the amount of the alkali material satisfies the range, the conversion rate from lithium phosphate to lithium hydroxide is fast.

For example, the alkali material added in this step may be $Ca(OH)_2$. The $Ca(OH)_2$ may be added in as a powder type and herein, mixed in a milling machine.

In the milling machine, the reactions of Reaction Schemes 3 and 4 may occur.

In addition, since the milling machine is connected with the reactor through a pipe, a process of preparing the milling filtrate with the milling machine and a process of obtaining a reaction product with the reactor may be performed as a circular process.

Herein, a mixture of the lithium phosphate slurry and the alkali material is added in the reactor after the milling, and the reaction product produced from the reactor is pumped to the lower part of the milling machine and discharged from the upper part thereof, and the discharged milling filtrate is added again in the reactor In this way, the milling increases a contact area of the lithium phosphate slurry and the alkali material and promotes the reactions of Reaction Schemes 3 and 4. In addition, the milling has an effect of removing hydroxyapatite, a byproduct on the surface of the lithium phosphate, through the reactions and thus does not reduce a surface area of the lithium phosphate from which lithium is dissolved out. Accordingly, a lithium dissolution rate, which is regarded as the slowest out of the entire conversion reaction from lithium phosphate to lithium hydroxide, is promoted, and thus an effect of increasing the final conversion rate from lithium phosphate to lithium hydroxide may be obtained.

On the other hand, the reactions of Reaction Schemes 3 and 4 in the reactor may occur. In other words, the reactions of Reaction Schemes 3 and 4 may occur under an atmospheric pressure (1 atm) at room temperature (25° C.).

Through the reactions of Reaction Schemes 3 and 4, lithium hydroxide (LiOH) is formed, and gypsum ($CaSO_4$) and hydroxyapatite ($Ca_5(PO_4)_3OH$) along therewith are also formed.

Subsequently, these reaction products are converted into lithium hydroxide.

In this reaction, the gypsum ($CaSO_4$) and the hydroxyapatite ($Ca_5(PO_4)_3OH$) formed along with the lithium hydroxide (LiOH) are solid-phase and thus may be separated through the solid/liquid separator.

Accordingly, when the reaction products are solid/liquid separated, a lithium hydroxide (LiOH) aqueous solution free from the solid-phase components may be concentrated and crystallized to produce lithium hydroxide.

Figure 2:
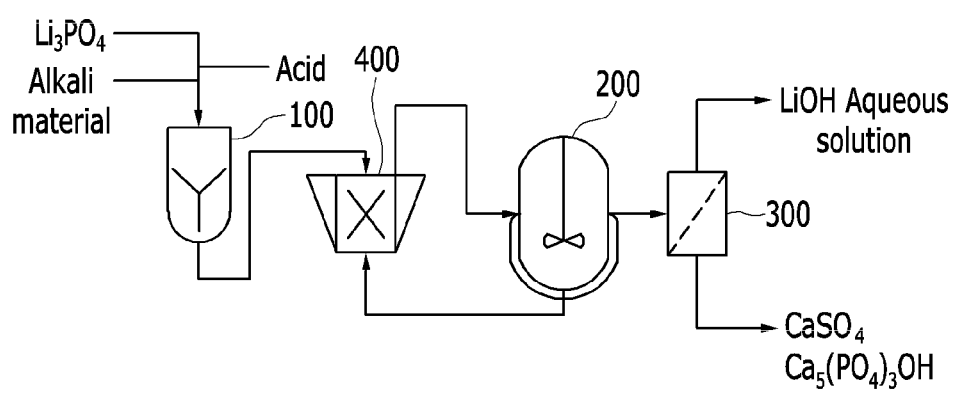
FIG. 2 shows a process of manufacturing lithium hydroxide from lithium phosphate according to another example embodiment.

Hereinafter, referring to FIG. 2, a method of manufacturing lithium hydroxide from lithium phosphate according to the present embodiment is illustrated in detail. FIG. 2 shows a process of manufacturing lithium hydroxide from lithium phosphate according to another example embodiment.

Referring to FIG. 2, a lithium phosphate particle and an alkali material are added in a mixer 100, and acid is added therein, if necessary. When the acid is added, the lithium phosphate particle and the acid may be added therein first, and the alkali material may be added thereto.

When the lithium phosphate particle and the acid are added therein, the reactions of Reaction Schemes 1 and 2 occur. The lithium phosphate may be a lithium phosphate cake. The added acid may be selected from the group consisting of hydrochloric acid, sulfuric acid, and nitric acid.

The alkali material may be one or more selected from the group consisting of $Ca(OH)_2$, NaOH, and CaO. After adding the alkali material, the alkali material is mixed with the lithium phosphate particle and the acid in the mixer 100.

The mixture in the mixer 100 is added to a milling machine 400 to prepare a milling filtrate.

Subsequently, the milling filtrate is added to a reactor 200.

Herein, the milling machine 400 and the reactor 200 are connected each other, so that the mixture may be several times circulated between the milling machine 400 and the reactor 200. For example, the mixture is milled in the milling machine 400 may be performed in a range of 50° C. to 99° C. and stays in the milling machine for 10 minutes to 1 hour out of the entire circulation reaction. During the circulation reaction, that is, in the milling machine 400 and the reactor 200, the reactions of Reaction Schemes 3 and 4 may occur under an atmospheric pressure (1 atm) in a range of room temperature (25° C.) to 90° C.

In the present embodiment, the milling filtrate in which a part of lithium has already been converted into lithium hydroxide through the circular process between the milling machine 400 and the reactor 200 is processed through the reactor 200 to obtain reaction products and convert the lithium phosphate to lithium hydroxide. According, a final conversion rate of the lithium hydroxide with the milling may be improved compared with a conversion rate of lithium hydroxide without the milling.

Subsequently, the reaction products obtained from the reactions in the reactor 200 are transferred to a solid/liquid separator 300. The solid/liquid separator 300 separates a liquid, LiOH from a solid, gypsum ($CaSO_4$) and hydroxyapatite ($Ca_5(PO_4)_3OH$).

Lithium carbonate or lithium hydroxide may be produced from the separated LiOH aqueous solution through a carbonation or crystallization process. The gypsum and hydroxyapatite may be reacted with sulfuric acid and phosphoric acid and gypsum may be produced.

Embodiments for the Invention

Hereinafter, the specification will be specifically examined through Examples.

Example 1: Conversion Reaction of Lithium Phosphate Including Acid→Lithium Hydroxide 1 L of a thin sulfuric acid solution was prepared by mixing 0.5 equivalents of sulfuric acid with distilled water based on that of lithium phosphate. Specifically, 37.18 g of sulfuric acid having purity of 95% was added thereto, and a sulfuric acid concentration of the sulfuric acid solution was 3.7 wt %.

Lithium phosphate was added to the sulfuric acid solution, so that an amount of lithium may be 10 g/L in slurry, and the mixture was stirred at 90° C. for 30 minutes to prepare the slurry.

The slurry was sampled to analyze a dissolution rate of the lithium phosphate, and the dissolution rate result was 81%.

Subsequently, 1.1 equivalent of calcium hydroxide ($Ca(OH)_2$) and the slurry based on the amount of the added lithium phosphate was added to a reactor and the obtained mixture was stirred at room temperature of 25° C. for one hour and then, solid/liquid separated with a vacuum filter to prepare a lithium hydroxide aqueous solution.

Examples 2 to 4 and Reference Example 1

A lithium hydroxide aqueous solution was prepared according to the same method as Example 1 except for changing an addition amount of sulfuric acid based on the amount of lithium phosphate as shown in Table 1 to prepare 1 L of a thin sulfuric acid solution having a concentration shown in Table 1.

Each slurry prepared by adding lithium phosphate to the sulfuric acid solutions according to Examples 2 to 4 and Reference Example 1 was sampled to analyze a dissolution rate of the lithium phosphate, and the results are shown in Table 2.

TABLE 1

|  | Reference Example 1 | Example 1 | Example 2 | Example 3 | Example 4 |
|---|---|---|---|---|---|
| Amount of sulfuric acid [equivalent] based on lithium phosphate | 0.33 | 0.5 | 0.67 | 0.83 | 1.0 |
| Amount of sulfuric acid (purity 95%) [g] | 24.79 | 37.18 | 49.58 | 61.97 | 74.36 |
| Concentration of prepared solution sulfuric acid [wt %] | 2.5 | 3.7 | 5.0 | 6.2 | 7.4 |

TABLE 2

|  | Reference Example 1 | Example 1 | Example 2 | Example 3 | Example 4 |
|---|---|---|---|---|---|
| Amount of sulfuric acid [equivalent] based on lithium phosphate | 0.33 | 0.5 | 0.67 | 0.83 | 1.0 |
| LP dissolution rate [%] | 53 | 81 | 100 | 100 | 100 |

Referring to Table 2, as the addition amount of sulfuric acid was increased, the dissolution rate of lithium phosphate was also increased. In addition, the lithium phosphate was completely dissolved, when greater than or equal to 0.67 equivalent of sulfuric acid is used based on that of lithium phosphate.

Comparative Example 1: Conversion Reaction of Lithium Phosphate without Acid→Lithium Hydroxide Lithium phosphate and distilled water were used to have an amount of lithium of 10 g/L in slurry in a reactor and then, stirred at 90° C. for 30 minutes to prepare the slurry.
Subsequently, 1.1 equivalent of calcium hydroxide (Ca(OH)$_2$) based on the amount of the added lithium phosphate and the slurry were added to the reactor, and the mixture was stirred at room temperature of 25° C. for one hour and then, solid/liquid separated with a vacuum filter to prepare a lithium hydroxide aqueous solution.

Experimental Example 1: Calculation of Conversion Rate from Lithium Phosphate to Lithium Hydroxide A conversion rate regarding the lithium hydroxide aqueous solutions according to Examples 1 to 4, Comparative Example 1, and Reference Example 1 was calculated.
Specifically, a conversion rate of lithium phosphate (LP)→lithium hydroxide (LH) was calculated by using a lithium amount of initially added lithium phosphate and after preparing a lithium hydroxide aqueous solution, a lithium amount in the aqueous solution. The conversion rate was calculated according to Equation 1, and the results are shown in Table 3.

$$\text{conversion rate}(\%) = \frac{\text{concentration of Li in aqueous solution}\left[\frac{g}{L}\right] \times \text{Volume of aqueous solution } [L]}{\text{Amount of Li in added Lithium phosophate } [g]} \times 100 \quad \text{[Equation 1]}$$

TABLE 3

|  | Comparative Example 1 | Reference Example 1 | Example 1 | Example 2 | Example 3 | Example 4 |
|---|---|---|---|---|---|---|
| Amount of sulfuric acid [equivalent] based on LP | 0 | 0.33 | 0.5 | 0.67 | 0.83 | 1.0 |
| LP-LH conversion rate [%] | 27 | 32 | 50 | 59 | 68 | 82 |

Referring to Table 3, Comparative Example 1 using no acid showed about 27% of a conversion rate under an equivalent condition.

On the contrary, the lithium hydroxide aqueous solutions using acid according to Examples 1 to 4 and Reference Example 1 all showed an increased conversion rate compared with that of Comparative Example 1.
Particularly, the lithium hydroxide aqueous solutions using greater than or equal to 0.5 equivalent of acid based on an amount of the added lithium phosphate according to Examples 1 to 4 showed greater than or equal to 50% of a conversion rate, which is greater than or equal to twice increased compared with one using no acid and greater than or equal to 1.5 times increased compared with Reference Example 1 using less than 0.5 equivalent of acid. In addition, Examples 2 to 4 using greater than or equal to 0.67 equivalent of sulfuric acid showed an increased conversion rate despite the same dissolution rate of lithium phosphate, as an addition amount of acid was increased.

Examples 5 to 6 and Reference Examples 2 to 3: Conversion Reaction of Lithium Phosphate without Acid→Lithium Hydroxide (Using a Milling Machine)

Lithium phosphate and distilled water were added to a reactor to have 10 g/L of lithium in slurry and then, stirred at 90° C. for 30 minutes to prepare the slurry.
Subsequently, 1.1 equivalent of calcium hydroxide (Ca(OH)$_2$) and the slurry based on an amount of the added lithium phosphate were added to a milling machine and milled at 90° C. for 15 minutes through a circular reaction with the reactor to prepare a milling filtrate.
Next, the milling filtrate was added to the reactor and stirred at 90° C. for one hour and solid/liquid separated through a vacuum filter to prepare a lithium hydroxide aqueous solution.
A conversion rate of lithium in the milling filtrates according to Examples 5 to 6 and Reference Examples 2 to 3 was calculated according to Equation 1, and the results are shown in Table 4.

TABLE 4

|  | Reference Example 2 | Reference Example 3 | Example 5 | Example 6 |
|---|---|---|---|---|
| Equivalent ratio of sulfuric acid based on LP | 0 | 0.01 | 0.016 | 0.18 |
| Li conversion rate in milling filtrate [%] | 14.7 | 14.9 | 27.6 | 28.8 |

Examples 1 to 4 and Reference Example 1 show a lithium conversion rate of near to 0% in the slurry, because the reactions of Reaction Schemes 3 and 4 occur after respectively adding the milling filtrates to the reactor.
However, referring to Table 4, a lithium conversion rate in the milling filtrate added to the reactor was greater than or equal to at least 14%. The reason is that since the reactions of Reaction Schemes 3 and 4 have already occurred during a circular process of the milling machine and the reactor, a part of lithium phosphate is converted into lithium hydroxide.

Accordingly, a conversion rate of lithium phosphate (LP)→lithium hydroxide (LH) by using an amount of lithium in a lithium hydroxide aqueous solution finally obtained from the reactor after the reactions may be predicted to be increased compared with those of Examples 1 to 4.

Accordingly, when a mixture of the lithium phosphate slurry and the alkali material was added to the reactor after the milling process without an addition of acid as shown in the present embodiment, a conversion rate of lithium phosphate (LP)→lithium hydroxide (LH) was remarkably improved.

In addition, when acid was added along with the milling process, particularly, comparing Examples 5 and 6 using greater than or equal to 0.015 equivalent of acid with Reference Examples 2 and 3 using less than 0.015 of acid, a conversion rate was almost twice increased by simultaneously using greater than or equal to 0.015 equivalent of acid with the milling process.

While this invention has been described in connection with what is presently considered to be practical example embodiments, it is to be understood that the invention is not limited to the disclosed embodiments, but, on the contrary, is intended to cover various modifications and equivalent arrangements included within the spirit and scope of the appended claims.

DESCRIPTION OF SYMBOLS

100: mixer
200: reactor
300: solid/liquid separator
400: milling machine

What is claimed is:

1. A method of manufacturing lithium hydroxide, comprising
    adding at least one acid selected from hydrochloric acid, sulfuric acid, and nitric acid into lithium phosphate slurry including a lithium phosphate particle;
    adding an alkali material to the lithium phosphate slurry including the acid and converting it into a lithium hydroxide aqueous solution; and
    after adding the alkali material to the lithium phosphate slurry including the acid and converting it into the lithium hydroxide aqueous solution, concentrating the lithium hydroxide aqueous solution to prepare the lithium hydroxide,
    wherein an amount of the added acid ranges from 0.67 equivalents to 1.0 equivalents based on an amount of the lithium phosphate particle, and
    the lithium phosphate slurry including the acid has a lithium concentration of 4,000 mg/L to 2,000 mg/L.

2. The method of manufacturing lithium hydroxide of claim 1, wherein an amount of the added alkali material may range from 0.8 to 1.5 equivalents based on an amount of the lithium phosphate particle.

3. The method of manufacturing lithium hydroxide of claim 1, wherein the alkali material is one or more selected from the group consisting of $Ca(OH)_2$, NaOH, and CaO.

4. The method of manufacturing lithium hydroxide of claim 1, wherein in the step of adding the alkali material to the lithium phosphate slurry including the acid and converting it into the lithium hydroxide aqueous solution, gypsum and hydroxyapatite are precipitated.

* * * * *